(12) United States Patent
Mahony et al.

(10) Patent No.: US 12,259,848 B2
(45) Date of Patent: *Mar. 25, 2025

(54) SYNCHRONOUS OBJECT PLACEMENT FOR INFORMATION LIFECYCLE MANAGEMENT

(71) Applicant: NetApp, Inc., San Jose, CA (US)

(72) Inventors: Robin Mahony, Vancouver (CA); Oliver Seiler, Vancouver (CA); Blake Edwards, Vancouver (CA); Vladimir Avram, Vancouver (CA); Gregory Kent, Vancouver (CA); Chong Zhao, Vancouver (CA)

(73) Assignee: NETAPP, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,512

(22) Filed: Dec. 12, 2022

(65) Prior Publication Data

US 2023/0109530 A1 Apr. 6, 2023

Related U.S. Application Data

(63) Continuation of application No. 16/677,565, filed on Nov. 7, 2019, now Pat. No. 11,531,642.

(51) Int. Cl.
*G06F 16/10* (2019.01)
*G06F 9/54* (2006.01)
(Continued)

(52) U.S. Cl.
CPC ............ *G06F 16/122* (2019.01); *G06F 9/542* (2013.01); *G06F 16/14* (2019.01); *G06F 16/178* (2019.01); *G06F 16/1824* (2019.01)

(58) Field of Classification Search
CPC .... G06F 16/122; G06F 16/1824; G06F 16/14; G06F 16/178; G06F 9/542
(Continued)

(56) References Cited

U.S. PATENT DOCUMENTS 9,727,522 B1\* 8/2017 Barber ................. G06F 9/5016
10,503,427 B2\* 12/2019 Botes ................. G06F 11/2094
(Continued)

FOREIGN PATENT DOCUMENTS

EP  3349132 A1  7/2018
JP  2014515524   6/2014
(Continued)

OTHER PUBLICATIONS

Verma et al., "An Architecture for Lifecycle Management in Very Large File Systems"; IEEE 2005.\*
(Continued)

*Primary Examiner* — Daniel A Kuddus
(74) *Attorney, Agent, or Firm* — HAYNES AND BOONE, LLP

(57) ABSTRACT

A distributed storage system may synchronously apply an Information Lifecycle Management (ILM) policy to objects at ingest. In one embodiment of synchronous ILM, three options are available for a user: balanced, strict, and dual commit. Dual commit refers to the behavior where one will always create two replicated copies in the same site and then apply ILM asynchronously. Strict refers to the behavior where the storage system attempts to apply the ILM policy synchronously on ingest, and if the storage system cannot the ingest of the object will fail. This ensures that the storage system can guarantee that ILM has been applied to recently ingested objects. Balanced refers to the behavior where the storage system attempts to apply ILM synchronously, but if the storage system cannot the storage system may fall-back to dual-commit.

20 Claims, 10 Drawing Sheets

(51) Int. Cl.
*G06F 16/11* (2019.01)
*G06F 16/14* (2019.01)
*G06F 16/178* (2019.01)
*G06F 16/182* (2019.01)

(58) Field of Classification Search
USPC .................. 707/694, 702, 704, 718, 731
See application file for complete search history.

(56) References Cited

U.S. PATENT DOCUMENTS

| | | | |
|---|---|---|---|
| 10,907,471 B2* | 2/2021 | Fripp | E21B 43/1185 |
| 10,917,471 B1* | 2/2021 | Karumbunathan | G06F 3/064 |
| 11,086,555 B1 | 8/2021 | Botes et al. | |
| 11,531,642 B2 | 12/2022 | Mahony et al. | |
| 11,625,416 B1 | 4/2023 | Grunwald et al. | |
| 2006/0004820 A1 | 1/2006 | Claudatos et al. | |
| 2007/0136387 A1* | 6/2007 | Malueg | G11C 11/16 |
| 2007/0136397 A1 | 6/2007 | Pragada et al. | |
| 2008/0280982 A1 | 11/2008 | Li et al. | |
| 2008/0281982 A1* | 11/2008 | Yanagihara | H04L 67/104 |
| | | | 709/242 |
| 2010/0185963 A1 | 7/2010 | Slik et al. | |
| 2012/0166726 A1 | 6/2012 | De Schrijver et al. | |
| 2014/0142874 A1* | 5/2014 | Martin | H02H 1/0015 |
| | | | 702/58 |
| 2014/0172874 A1* | 6/2014 | Rober | G06F 16/433 |
| | | | 707/748 |
| 2015/0347043 A1* | 12/2015 | Barron | G06F 3/0689 |
| | | | 711/114 |
| 2016/0246676 A1* | 8/2016 | Bakre | G06F 11/1088 |
| 2017/0286239 A1* | 10/2017 | Baptist | G06F 3/061 |
| 2018/0097708 A1 | 4/2018 | Winkelstrater | |
| 2018/0260125 A1* | 9/2018 | Botes | G06F 11/2094 |
| 2018/0314706 A1* | 11/2018 | Sirton | H04L 67/1097 |
| 2019/0354628 A1* | 11/2019 | Grunwald | G06F 11/2069 |
| 2021/0360066 A1* | 11/2021 | Karumbunathan | H04L 67/146 |

FOREIGN PATENT DOCUMENTS

| | | |
|---|---|---|
| WO | 2014052890 A1 | 4/2014 |
| WO | 2018201103 A1 | 11/2018 |

OTHER PUBLICATIONS

Mitra et al. Query-based Partitioning of Documents and Indexes for Information Lifecycle Management; ACM 2008.*

Office Action for Japanese Application No. JP2020185749 mailed on Aug. 16, 2022, 4 pages.

Amazon Simple Storage Service—API Reference, Version Mar. 1, 2006, pp. 1-1518.

Elastic: "Get Pipeline API, Java REST Client [7.4] Elastic," Oct. 1, 2019, pp. 1-3, XP055790625, retrieved on Mar. 28, 2021, Retrieved from the Internet: URL:https://www.elastic.co/guide/en/elasticsearch/clienl/java-resl/7.4/ ava-rest-high-ingest-get-pipeline.html.

Extended European Search Report for Application No. 20206508.2 dated Apr. 7, 2021, 7 pages.

Mitra S., et al., "Query-Based Partitioning of Documents and Indexes for Information Lifecycle Management," ACM, 2008, pp. 623-636.

Office Action for Japanese Application No. JP2020185749 mailed on Jan. 4, 2022, 6 pages.

Verma A., et al., "An Architecture for Lifecycle Management in Very Large File Systems," IEEE, 2005.

First CN Office Action for Application No. 202011232377, mailed on Jan. 10, 2024, 08 pages.

Notice of Grant of Invention Patent Right for CN Application No. 202011232377, mailed on Aug. 22, 2024, 06 pages.

* cited by examiner

SYNCHRONOUS OBJECT PLACEMENT FOR INFORMATION LIFECYCLE MANAGEMENT

CROSS REFERENCE TO RELATED APPLICATIONS

The present application is a Continuation of U.S. patent application Ser. No. 16/677,565, filed Nov. 7, 2019, which is hereby incorporated by reference in its entirety as if fully set forth below and for all applicable purposes.

BACKGROUND

The disclosure generally relates to the field of data processing, and more particularly to database and file management or data structures.

Information Lifecycle Management (ILM) typically includes the policies, processes, practices, services and tools used to align the business/regulatory requirements of information with appropriate and cost-effective infrastructure from the time information is created through its final disposition. ILM can align information with business requirements through management policies and service levels associated with applications, metadata, and data. An organization specifies a set of ILM rules to be applied to data. A collection of ILM rules can be specified in an ILM policy. Some factors that influence an ILM policy include cost of managing enterprise data, compliance with various laws and regulations across various jurisdictions and data domains (e.g., health related data), litigation readiness, and enterprise scale content management. Generally, accessibility requirements and value of data wears as time passes. Thus, an ILM policy will typically store less valuable data in a manner that reflects the decreasing value of the data (e.g., fewer copies, less resource intensive data protection, higher latency, etc.).

BRIEF DESCRIPTION OF THE DRAWINGS

Embodiments of the disclosure may be better understood by referencing the accompanying drawings.

DESCRIPTION

Figure 1:
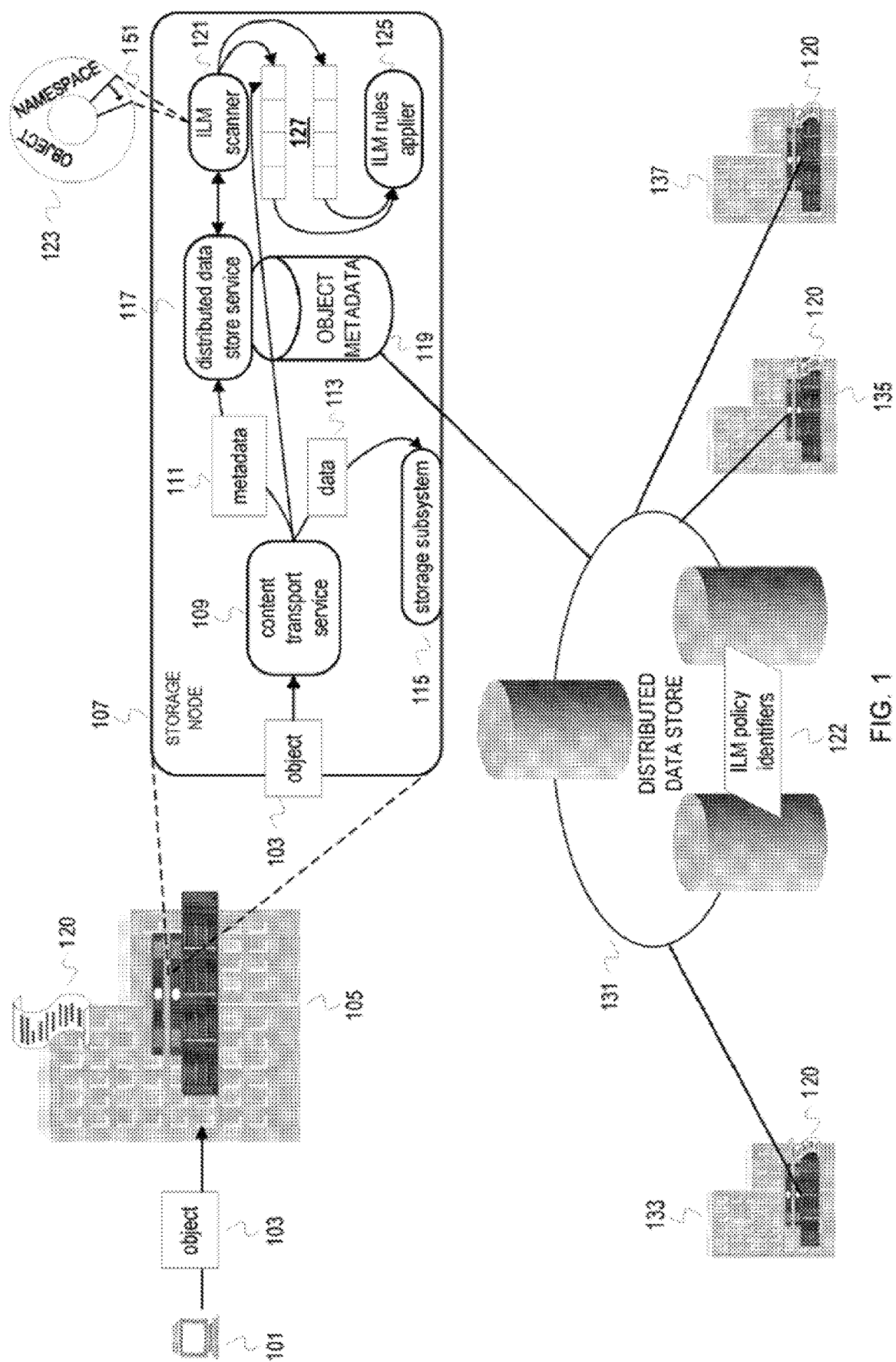
FIG. 1 is a conceptual diagram of a distributed storage system for applying ILM policies at ingest and throughout the lifecycle of an object.

The description that follows includes example systems, methods, techniques, and program flows that embody embodiments of the disclosure. However, it is understood that this disclosure may be practiced without these specific details. In other instances, well-known instruction instances, protocols, structures and techniques have not been shown in detail in order not to obfuscate the description.

Overview

Users of a geographically distributed large-scale storage system ("storage system," "distributed storage system," or "grid") may configure Information Lifecycle Management (ILM) rules for their objects. However, on ingest, two replicated copies of user data may be in the same site for redundancy and then apply ILM to create the final placement after the fact. For example, a user may wish to erasure code their data so the storage system can create two replicated copies in the same site immediately and then asynchronously erasure code the data after ingest.

Two main problems with this workflow may be addressed herein with synchronous ILM. First, there is an inefficiency in that for ILM polices other than ones that require two replicated copies in the same site (e.g., the ILM policy is the same as the default), the storage system may be doing wasted work: the storage system may have to create two replicated copies that are eventually discarded. Secondly, users may have little visibility into when the storage system has finished applying the ILM policy to objects that are ingested.

According to aspects of the present disclosure, the storage system may be configured to apply data lifecycle polices synchronously at ingest. To illustrate the differences between the two approaches, an example storage system is presented where a user has an ILM rule to create one replicated copy in each of two sites A and B.

In the first approach:
1. The storage system creates two replicated copies in Site A.
2. Return a success response (e.g., a HyperText Transfer Protocol (HTTP) "200 OK" success status response code to an S3 PUT request) and queue this object for life cycle management.
3. Asynchronous life-cycle rules are activated.
4. The storage system creates another copy in Site B, to fulfill the ILM policy.
5. The storage system deletes one of the replicated copies in Site A.

Notice, in the first approach, because the storage system returned the success response (a 200 OK) to the client before applying the ILM, the storage system may not be able to guarantee anything about the application of life-cycle management. The storage system may attempt to apply the ILM policy immediately, but the storage system may not be able to guarantee it. In the first approach, the ILM policy may be applied asynchronously as follows:
1. A client performs a request to store an object (e.g. a PUT request), the storage system may queue the object in memory for ILM processing and then return a success response (e.g. a 200 OK).
2. If the storage system is under a large amount of load, the storage system may choose to drop this initial in-memory queuing of the object and defer to scanning ILM.
2a. A scanning process may be used that handles re-scanning the objects in the storage system and applying ILM when required. When the storage system defers an action from synchronous ILM, the user now has to wait for this scan to pick it up again. An example of this scanning process is described in U.S. Patent Publication No. 2018/0314706 A1 titled "Iterative Object Scanning For Information Lifecycle Management" incorporated by reference in its entirety.

3. If the storage system does not drop the initial in-memory queuing of the object, the storage system may attempt to perform the ILM immediately. However, if application of the ILM policy is not achievable at the time (for instance, an entire site of the storage system is down or not connectable), the storage system may defer this until a later time and again rely on scanning ILM.

Because of the nature of the asynchronous process, which returns a success response after initial ingest but prior to applying ILM rules, storage systems may not be able to guarantee with certainty that ILM has been applied to an object that was just ingested. Synchronous ILM enables this.

In the second approach, according to embodiments of the present disclosure:

1. A client performs a request to store an object (e.g. a PUT request), the storage system may create a replicated copy in Site A, and one in Site B.
2. The storage system may return the success response (e.g., "200 OK" to the S3 PUT request).

In this second approach, resource consumption of the storage system for this PUT request has 1 fewer copy of a replicated object created, and 1 less delete/unlink used. Copies of the replicated (or erasure coded) object are created without storing interim copies of the object in the distributed storage system. Embodiments of the present disclosure ensure that the storage system reduces the resource consumption of this PUT request (by, for example, having one fewer copy of a replicated object created by the storage system, and one less delete/unlink required).

In an embodiment of synchronous ILM, three options are available for a user: balanced, strict, and dual commit. Dual commit refers to the behavior where a storage node of a distributed storage system creates two replicated copies in the same site and then apply ILM asynchronously. Selecting dual commit may be advantageous in some scenarios, such as for storage system instances with high inter-site latency and that have ample hardware resources to spare (e.g., not CPU or I/O constrained, so the increased efficiency of ingesting the object synchronously is not required). In other embodiments, other default behaviors may be offered before application of the ILM policy asynchronously such as creating a single copy at a site, three or more copies at a site, or a more complex default. Strict refers to the behavior where the storage system attempts to apply the ILM policy synchronously on ingest, and if it cannot the S3/Swift PUT will fail. This ensures that the storage system can guarantee that ILM has been applied to recently ingested objects. Balanced refers to the behavior where the storage system attempts to apply ILM synchronously, but if the storage system cannot (e.g., failure to connect to a remote site) the storage system may fall-back to dual commit or another fall-back rule. Some storage systems may set balanced as a default setting for new ILM policies. The balanced setting may be just as available as dual commit but, most of the time, have the efficiency benefits of being synchronous. Using the balanced approach may be advantageous where users do not require the guarantee of ingest time ILM application but do want to take advantage of the efficiency benefits.

Applying ILM policies synchronously at ingest offers a number of advantages. A storage system according to embodiments of the present disclosure has the ability to give guaranteed application of a life cycle policy. This may be desired by customers that have service-level agreements (SLAs) for data protection, and want to be able to guarantee that their data meet their SLAs. For instance, an SLA may have a statement such as "we will have replicated copies of all data in at least two geographic locations."

A storage system according to embodiments of the present disclosure may also increase efficiency by applying ILM rules synchronously; this may reduce the consumption I/O, CPU and/or other resources when ingesting data (for instance, if an ILM policy has a rule to create one replicated copy in each site and there are two sites). In certain systems under prior approaches, the flow would have been to create two replicated copies in Site A, then the storage system may create another replicated copy in Site B, then delete one of the replicated copies in Site A. Instead, applying ILM rules at ingest synchronously according to embodiments of the present disclosure removes one of these replications and the removal.

Synchronous ILM additionally offers better data security. For example, object data is immediately protected as specified in the ILM rule's placement instructions, which can be configured to protect against a wide variety of failure conditions, including the failure of more than one storage location. Further, synchronous ILM offers more efficient grid operation. Each object is processed only once as it is ingested. Because the distributed storage system does not need to track or delete interim copies, there is less processing load and less database space consumed.

Example Illustrations

FIG. 1 is a conceptual diagram of a distributed storage system for applying ILM policies at ingest and throughout the lifecycle of an object. The distributed storage system is geographically distributed across multiple sites that include sites 105, 133, 135, and 137 (as an example of any number of sites), which communicate via a network including a wide area network (WAN). Each of the sites may house multiple storage nodes and storage devices. A storage node includes a collection of processes (application processes, services, etc.) that store object data and metadata to storage devices and access object data and metadata in storage devices. The collection of processes can be encapsulated by a virtual machine and/or a physical host machine. Storage nodes at any of the sites 105, 133, 135, and 137 can ingest objects into the grid. Ingest refers to the operations by one or more storage nodes to store an object in the grid according to a client request and any governing ILM policy(ies). The ingest process includes assigning an object identifier to an object based on an object namespace defined for the grid. Ingest can include an object being divided into its content data and metadata, caching, replication, erasure coding, etc. Interfaces that connect with the distributed storage system may include an object-storage application programming interface (API) such as an S3-style API (based on the AMAZON Simple Storage Service (S3) API) or a Swift-style API (based on the OpenStack Object Storage project Swift API) to store the object in the grid (to name just two examples to which embodiments of the present disclosure may apply). An API Reference Manual for S3 may be found in "Amazon Simple Storage Service API Reference API Version 2006 Mar. 1" incorporated by reference in its entirety.

Ingest begins when a client application (e.g., an S3 or Swift client-based application) establishes a connection to save an object to the storage system, and is complete when the storage system returns an "ingest successful" message to the client. Object data may be protected during ingest either by applying ILM instructions immediately (synchronous placement) or by creating interim copies and applying ILM later (dual commit), depending on how ILM was specified.

Storage nodes of the grid apply an ILM policy 120 to objects at ingest and throughout the life of the objects in the grid. Each storage node of the grid is responsible for a different region of an object namespace 123. A subset of storage nodes ("administrative nodes") at each site in the distributed storage system maintains a copy of the ILM policy 120. A modification or replacement of the ILM policy can be made at one of the administrative nodes and communicated throughout the storage system to the other administrative nodes at the different sites. The constituent ILM rules are distilled from the ILM policy 120 and accessed by the ILM rules applier 125. To address the case of change in ILM policy, the grid maintains proposed and current ILM indications (ILM policy identifiers 122) in a distributed data store (or distributed database) 131 accessible to the storage nodes of the grid. To enhance utility, the ILM policies, current and proposed, are identified with identifiers derived from the constituent rules (e.g., hash values) to capture differences in rules. Examples of ILM rules include replication rules, storage grade or tier rules, data protection rules, etc. An ILM rule set is usually expressed as an ILM policy for coherent organization of the rules including prioritization. To apply an ILM policy or rule set, a storage node evaluates metadata of objects against each of the rules in the rule set in order of priority and determines whether an ILM task is to be performed based on the rule evaluation. To illustrate, a placement rule and storage grade rule may be triggered based on size and age of an object resulting in the object content data being moved to storage nodes at different sites assigned to a lower grade storage pool. The distributed data store 131 hosts the object metadata, although different distributed data stores can be used for the object metadata and the ILM policy identifiers 122. Since an ILM policy can be changed and the distributed data store 131 may be an eventually consistent distributed data store, the storage node across the grid may be applying different versions of an ILM policy or different ILM policies.

For this example illustration, a storage node 107 at the site 105 includes a content transport service 109, a storage subsystem 115, a distributed data store service 117, an ILM scanner 121, and an ILM rules applier 125. The content transport service 109 manages the initial operations for ingest of an object. The initial ingest operations handled by the content transport service 109 can include request handling, data storing, storage management, data transfer to another storage node, and operations of storage protocol interfaces. The data storing operations can include local caching of object content data and routing or storing of object metadata. The initial ingest operations may include applying ingest-based ILM rules. For example, the distributed storage system, at a storage node 107 at the site 105, may protect objects during ingest by performing synchronous placement, which evaluates ILM and makes the copies that meet requirements as the object is ingested, or by performing a default ILM rule such as dual commit, which creates interim copies and then evaluates ILM later. An administrative user may specify the method used for each object when creating ILM rules.

The storage subsystem 115 interfaces with storage devices and/or external storage services for storing data to storage devices (physical or virtual) in response to commands or requests from the content transport service 109. The distributed data store service 117 performs operations corresponding to the distributed data store 131, including managing a local instance 119 of the distributed data store 131 that includes metadata of objects in the grid. The distributed data store service 117 handles requests from the content transport service 109 and the ILM scanner 121 that target the distributed data store 131. The ILM scanner 121 may continuously scan object metadata of objects within a region(s) of the object namespace 123 self-assigned to the ILM scanner 121. The ILM scanner 121 requests object metadata from the distributed data store service 117, and enqueues object metadata into a set of queues 127 ("ILM metadata queues") based on evaluation priority. The ILM rules applier 125 selects object metadata from the ILM metadata queues 127, evaluates object metadata against the ILM rule set of the ILM policy 120, and performs a resulting ILM task depending on whether the task is risky.

In some examples, ILM changes may occur while a multipart upload is in progress. Each part of the upload is placed according to the rule that is active when the part is ingested; when the multipart upload completes, some parts of the object might not meet current ILM requirements. In these cases, ingest of the object does not fail. Instead, any part that is not placed correctly may be queued for ILM re-evaluation, and is moved to the correct location later.

For the FIG. 1 illustration, a client 101 requests storing of an object 103 into the grid. The storage node 107 of the site 105 receives this request and the object 103. The content transport service 109 determines an object identifier for the object 103 within the object namespace 123. The content transport service 109 divides the object 103 into object metadata 111 and content data 113 and associates both with the object identifier of the object 103. The object metadata 111 may indicate data size, data type, date of creation, time/date of ingest, data owner, etc. The metadata 111 can include metadata created by the storage node 107 (e.g., site identifier corresponding to the ingesting storage node) in addition to the metadata already indicated in the object 103. In some examples, a user may determine whether to have the content transport service 109 perform an in-line ILM evaluation at ingest of the object 103 or to have the content transport service 109 locally store the data content 113 in storage devices of the site 105 via the storage subsystem 115 prior to an initial ILM evaluation (e.g., prior to fragmentation and fragment distribution across multiple storage nodes of the distributed storage system according to an erasure coding scheme).

Thus, when a default or dual-commit option is selected, the metadata 111 may initially indicate the storage node 107 as location of the content data 113. The content transport service 109 requests the distributed data store service 117 to store the metadata 111 into the local instance 119 of the distributed data store 131. The content transport service 109 also inserts the metadata 111 into the ILM metadata queues 127. The ILM metadata queues 127 may include a first priority queue and a second priority queue. The content transport service 109 inserts metadata for objects at ingest into the higher priority queue (i.e., first priority queue) of the queues 127. The ILM rules applier 125 can dequeue in a manner that biases to the first priority queue without starving the second priority queue (e.g., weighted round robin).

However, when other options are selected such as strict or balanced options, local caching is not necessarily implemented as part of ingest. The content transport service 109 can be programmed to evaluate the object metadata 111 against the ILM policy 120 at ingest and perform the ILM tasks determined from the rule evaluation instead of delegating to the ILM rules applier 125 asynchronously.

Figure 2:
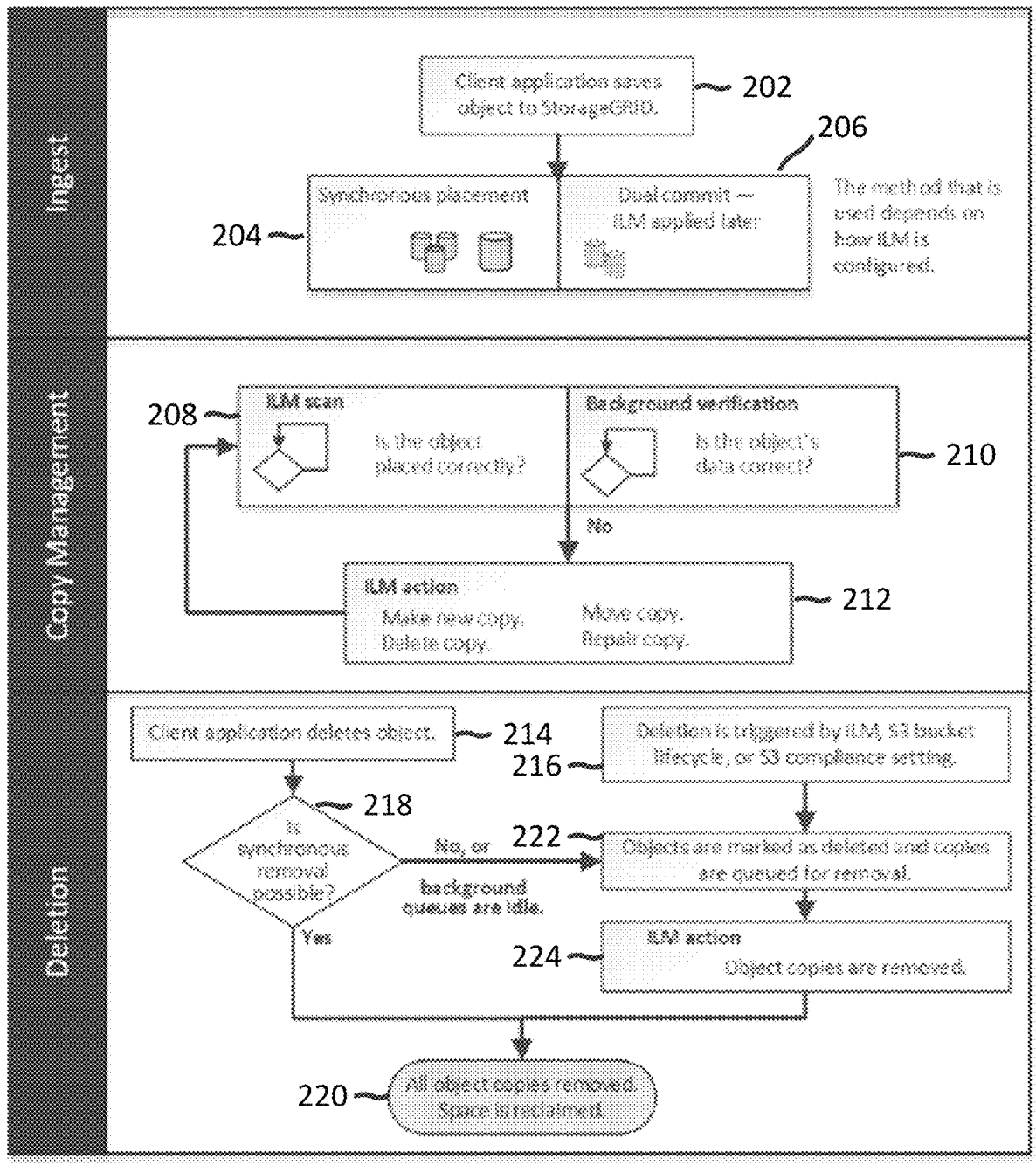
FIG. 2 is a chart illustrating ILM management of objects during stages of the lifecycle of the object.

FIG. 2 is a chart illustrating ILM management of objects during stages of the lifecycle of the object.

Ingest: Ingest begins when a client application (e.g., an S3 or Swift client application) establishes a connection to save an object to the distributed storage system, at block 202, and is complete when the distributed storage system returns an "ingest successful" message to the client. Object data is protected during ingest either by applying ILM instructions immediately (synchronous placement), at block 204, or by creating interim copies and applying ILM later (dual commit), at block 206, depending on how the ILM requirements are specified.

Copy management: After creating the number and type of object copies that are specified in the ILM's placement instructions, the distributed storage system manages object locations and protects objects against loss.

ILM scanning and evaluation: the distributed storage system may continuously scan the list of objects stored in the grid and checks if the current copies meet ILM requirements, at block 208. In other embodiments, the distributed storage system periodically scans objects at regular intervals. In further embodiments, the distributed storage system may not scan objects are regular intervals but may scan based on triggers. Triggers may include movement of objects, changes in metadata of objects, an increase in the frequency of accesses of an objects.

When different types, numbers, or locations of object copies are required, the distributed storage system creates, deletes, or moves copies as needed. Background verification: the distributed storage system continuously performs background verification to check the integrity of object data, at block 210. If a problem is found, the distributed storage system automatically creates a new object copy or a replacement erasure coded object fragment in a location that meets current ILM requirements, at block 212.

Object deletion: Management of an object ends when the copies are removed from the distributed storage system. Objects can be removed as a result of a delete request by a client, at block 214, or as a result of deletion by ILM, deletion caused by the expiration of an S3 bucket lifecycle, or automatic deletion triggered by the end of the retention period of a compliant S3 bucket, at block 216. After a client requests object removal, the distributed storage system determines whether synchronous (e.g., immediate) removal is possible (e.g., if all copies are stored within the distributed storage system and not on a cloud, or on slow to access tape backup, or all sites are accessible) at block 218. If so, the object copies are removed and the space is reclaimed, at block 220. If not, (or when the deletion is triggered by ILM), at block 222, objects are marked as deleted and copies are queued for removal. Subsequently, object copies are removed, at block 224.

Figure 3:
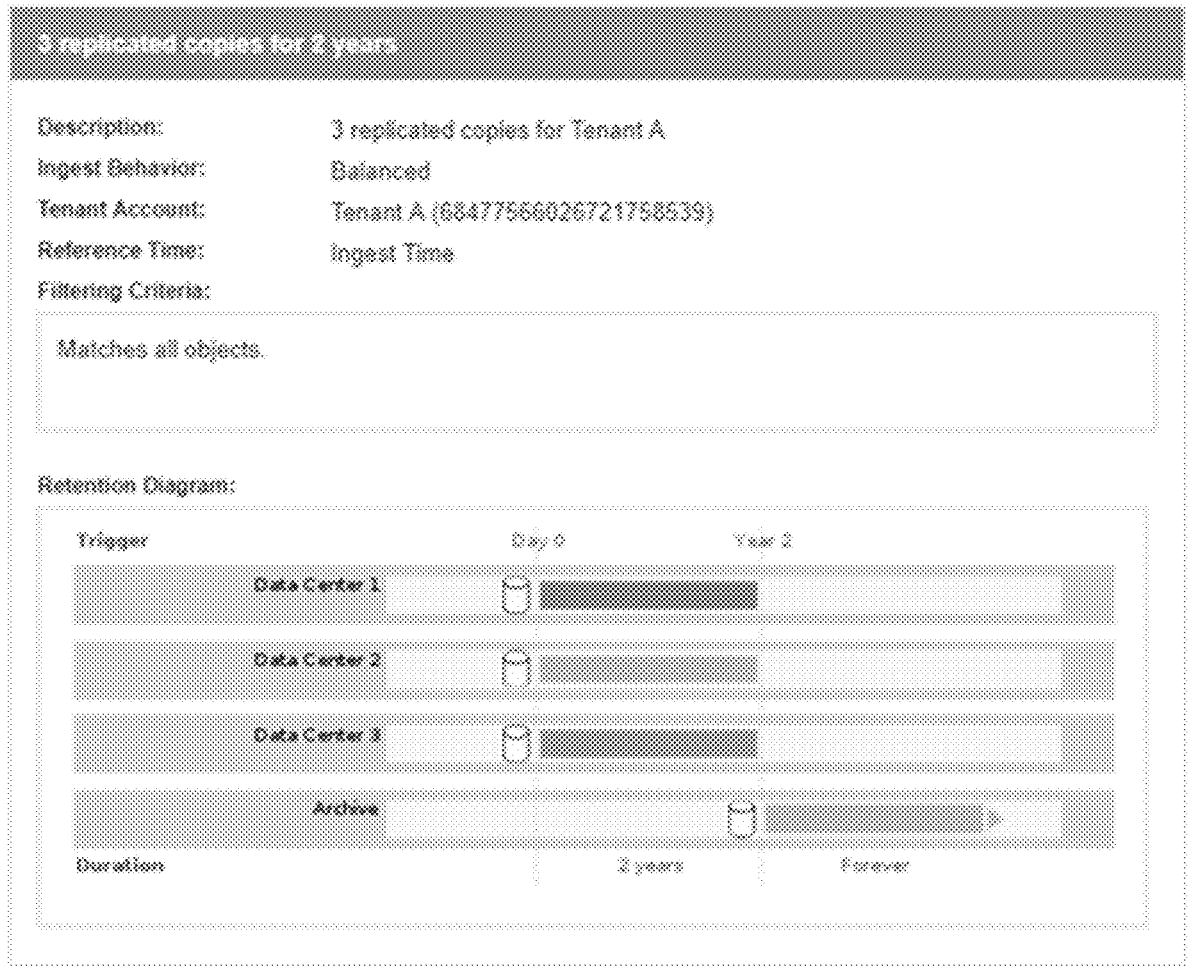
FIG. 3 is an exemplary interface illustrating an ILM rule to operate a distributed storage system.

FIG. 3 is an exemplary interface illustrating an ILM rule to operate a distributed storage system. An ILM rule may include three elements: (1) Filtering criteria: A rule's basic and advanced filtering criteria define which objects the rule applies to. If an object matches the filtering criteria, the distributed storage system applies the rule and creates the object copies specified in the rule's placement instructions. (2) Placement instructions: A rule's placement instructions define the number, type, and location of object copies. Each rule can include a sequence of placement instructions to change the number, type, and location of object copies over time. When the time period for one placement expires, the instructions in the next placement are automatically applied by the next ILM evaluation. (3) Ingest behavior: A rule's ingest behavior defines what happens when a client (e.g., S3 or Swift) saves an object to the grid. Ingest behavior controls whether object copies are immediately placed according to the instructions in the rule, or if interim copies are made and the placement instructions are applied later.

Placement instructions determine where, when, and how object data is stored. An ILM rule can include one or more placement instructions. Each placement instruction applies to a single period of time. When a user creates a placement instruction, the user may specify when the placement applies (the time period), which type of copies to create (replicated or erasure coded), and where to store the copies (one or more storage locations). Within a single rule a user may specify multiple placements for one time period, and placement instructions for more than one time period.

When a user defines the set of placement instructions for a rule, the user may be required to ensure that at least one placement instruction begins at day 0 (e.g., at ingest), that there are no gaps between the defined time periods, and that the final placement instruction continues either forever/indefinitely or until any object copies are no longer needed. As each time period in the rule expires, the content placement instructions for the next time period may be applied. New object copies are created and any unneeded copies are deleted.

As illustrated in the example of FIG. 3, the exemplary ILM rule applies to the objects belonging to Tenant A in the distributed storage system. The rule calls for the distributed storage system to make three replicated copies of the ingested objects and store each copy at a different data center for two years. After two years, one copy is moved to archive storage forever (or indefinitely). This ILM rule uses the balanced option for ingest behavior: the three-copy placement instruction is applied as soon as Tenant A saves an object to a distributed storage system, unless it is not possible to immediately make the three requested copies. In that case, the distributed storage system immediately makes two interim copies on two different storage nodes, and makes the required copies later.

When a user creates an ILM rule, they may specify filtering criteria to identify which objects the rule applies to. Filtering criteria can be simple or complex. In the simplest case, a rule might not specify any filtering criteria. A rule without filtering criteria applies to the objects, which would apply in the case where each item of the data has the same storage requirements. An example of a rule without filtering criteria is the stock rule "Make 2 Copies," which stores two replicated object copies forever on any two storage nodes. The "Make 2 Copies" rule can be used for the objects if a user does not have more specific storage needs. A user can also include the "Make 2 Copies" rule as the default rule in an ILM policy to provide storage instructions for objects that do not meet any of the filtering criteria in other rules. Basic filtering criteria allow a user to apply different rules to large, distinct groups of objects. The filters available may be created using a "Create ILM Rule" wizard for Tenant Accounts, for S3 Buckets, or for Swift containers (as two examples). These basic filters allow a user a simple way to apply different rules to large numbers of objects. For example, a company's financial records might need to be stored to meet regulatory requirements, while data from the marketing department might need to be stored to facilitate daily operations. After creating separate tenant accounts for each department or after segregating data from the different departments into separate S3 buckets, a user can easily create one rule that applies to all financial records and a second rule that applies to all marketing data. Advanced filtering options within the "Create ILM Rule" wizard may give a user granular controls. A user may create filtering criteria to select objects based on one or more of the following object properties: ingest time, last access time, all or part of the object name (Key), S3 bucket region (Location Constraint), object size, user metadata, and S3 object tags. Table 1 describes different metadata types that may be used as filtering criteria.

TABLE 1

| Metadata type | Supported Operators | Metadata value | Object Type S3 | Swift |
|---|---|---|---|---|
| Ingest Time (microseconds) | equals<br>does not equal<br>less than<br>less than or equals<br>greater than<br>greater than or equals | Time and date the object was ingested, in microseconds since Unix Epoch. | Yes | Yes |
| Key | equals<br>does not equal<br>contains<br>does not contain<br>starts with<br>does not start with<br>ends with<br>does not end with | All or part of a unique S3 or Swift object key.<br>For example, a user may match objects that end with ".txt" or start with "test-object/". | Yes | Yes |
| Last Access Time (microseconds) | equals<br>does not equal<br>less than<br>less than or equals<br>greater than<br>greater than or equals<br>exists<br>does not exist | Time and date the object was last retrieved (read or viewed) in microseconds since Unix Epoch.<br>In some examples, if last access time is used as an advanced filter, Last Access Time updates may need to be enabled for the S3 bucket or Swift container. | Yes | Yes |
| Location Constraint (S3 only) | equals<br>does not equal | The region where an S3 bucket was created. | Yes | No |
| Object Size (MB) | equals<br>not equals<br>less than<br>less than or equals<br>greater than<br>greater than or equals | The object's size in MB. | Yes | Yes |
| User Metadata | contains<br>ends with<br>equals<br>exists<br>does not contain<br>does not end with<br>does not equal<br>does not exist<br>does not start with<br>starts with | Key-value pair, where User Metadata Name is the key and User Metadata Value is the value.<br>For example, to filter on objects that have user metadata of color = blue, specify color for User Metadata Name, equals for the operator, and blue for User Metadata Value.<br>Note: User-metadata names are not case sensitive; user-metadata values are case sensitive. | Yes | Yes |
| Object Tag (S3 only) | contains<br>ends with<br>equals<br>exists<br>does not contain<br>does not end with<br>does not equal<br>does not exist<br>does not start with<br>starts with | Key-value pair, where Object Tag Name is the key and Object Tag Value is the value.<br>For example, to filter on objects that have an object tag of Image = True, specify Image for Object Tag Name, equals for the operator, and True for Object Tag Value.<br>Note: Object tag names and object tag values may be case sensitive. | Yes | No |

A user can use advanced filtering to create very specific filtering criteria. For example, objects stored by a hospital's imaging department might be used frequently when they are less than 30 days old and infrequently afterwards, while objects that contain patient visit information might need to be copied to the billing department at the health network's headquarters. A user can create filters that identify each type of object based on object name, size, S3 object tags, or any other relevant criteria, and then create separate rules to store each set of objects appropriately.

A user may also combine basic and advanced filtering criteria as needed in a single rule. For example, the marketing department might want to store large image files differently than their vendor records, while the Human Resources department might need to store personnel records in a specific geography and policy information centrally. In this case a user can create rules that filter by tenant account to segregate the records from each department, while using advanced filters in each rule that identify the specific type of objects that the rule applies to.

Figure 4:
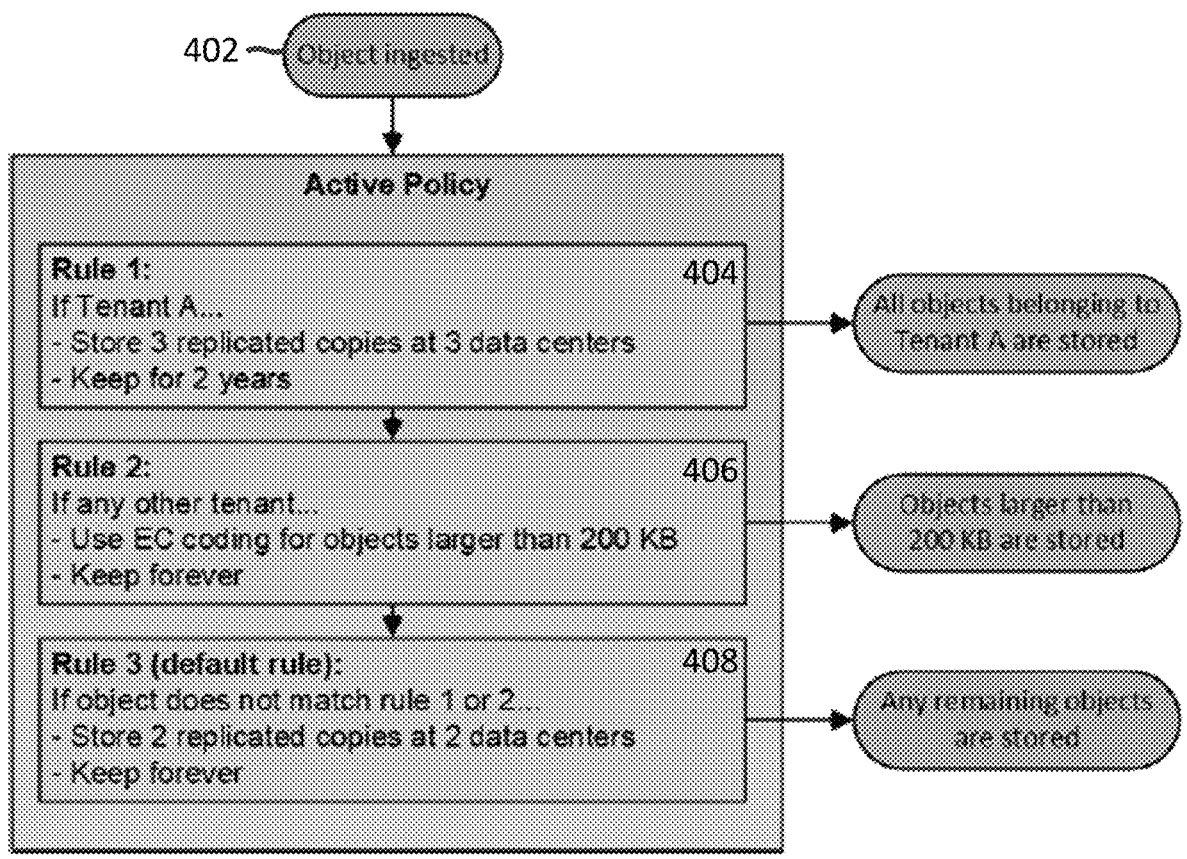
FIG. 4 is a flowchart illustrating an exemplary ILM policy to operate a distributed storage system.

FIG. 4 is a flowchart illustrating an exemplary ILM policy to operate a distributed storage system. An information lifecycle management (ILM) policy includes an ordered set of ILM rules that determines how the distributed storage system manages object data over time. In an exemplary ILM policy, the active ILM policy for a distributed storage system controls the placement, duration, and data protection of all objects. When clients save objects to the distributed storage system, the objects may be evaluated against the ordered set of ILM rules in the active policy, as follows: If the filtering criteria for the first rule in the policy match an object's metadata, the object is ingested according to that rule's ingest behavior and stored according to that rule's placement instructions. If the filtering criteria for the first rule does not match the object's metadata, the object is evaluated against each subsequent rule in the policy until a match is made. If no rules match the object's metadata, the ingest behavior and placement instructions for the default rule in the policy are applied.

To manage objects, a user may create a set of information management lifecycle (ILM) rules and organize them into an ILM policy. Every object ingested into the system may be evaluated against the active policy. When a rule in the policy matches an object's metadata, the instructions in the rule determine what actions the distributed storage system takes to copy and store that object. ILM rules may define: (1) Which objects should be stored. A rule can apply to all objects, to objects belonging to a specific tenant account or bucket/container, or to objects that contain specific metadata values. (2) The storage type and location. Objects can be stored on storage nodes, in cloud storage pools, or on archive nodes. (3) The type of object copies made. Copies can be replicated or erasure coded. (4) For replicated copies, the number of copies made. (5) For erasure coded copies, the erasure coding algorithm used. (6) The changes over time to an object's storage location and type of copies. (7) How object data is protected as objects are ingested into the grid (synchronous placement or dual commit). In some examples, object metadata may not be managed by ILM rules. Instead, object metadata may be stored in a database (e.g., an APACHE CASSANDRA database) in what is known as a metadata store. Multiple (e.g., three) copies of object metadata may be automatically maintained at each site to protect the data from loss. The copies may be load balanced across all storage nodes of the distributed storage system.

When an object is ingested, at block 402, the active policy is applied. In the illustrated example, all objects belonging to Tenant A are matched by "Rule 1" and are stored as three replicated copies at three data centers, at block 404. Objects belonging to other tenants are not matched by the first rule, so they are evaluated against the next rule in the policy. "Rule 2" applies to objects stored by any tenant that are larger than a defined size (e.g., 200 KB in the illustrated example), at block 406. These larger objects are stored using erasure coding across two data center sites. Objects 200 KB (in the example) or smaller are not matched by the second rule, so they are evaluated against the third rule. "Rule 3" is the default rule for the policy. The default rule is applied to any objects that do not match any other rule in the policy, at block 408. In this example, the default rule makes two replicated copies of all objects 200 KB or smaller that do not belong to Tenant A.

Figure 5:
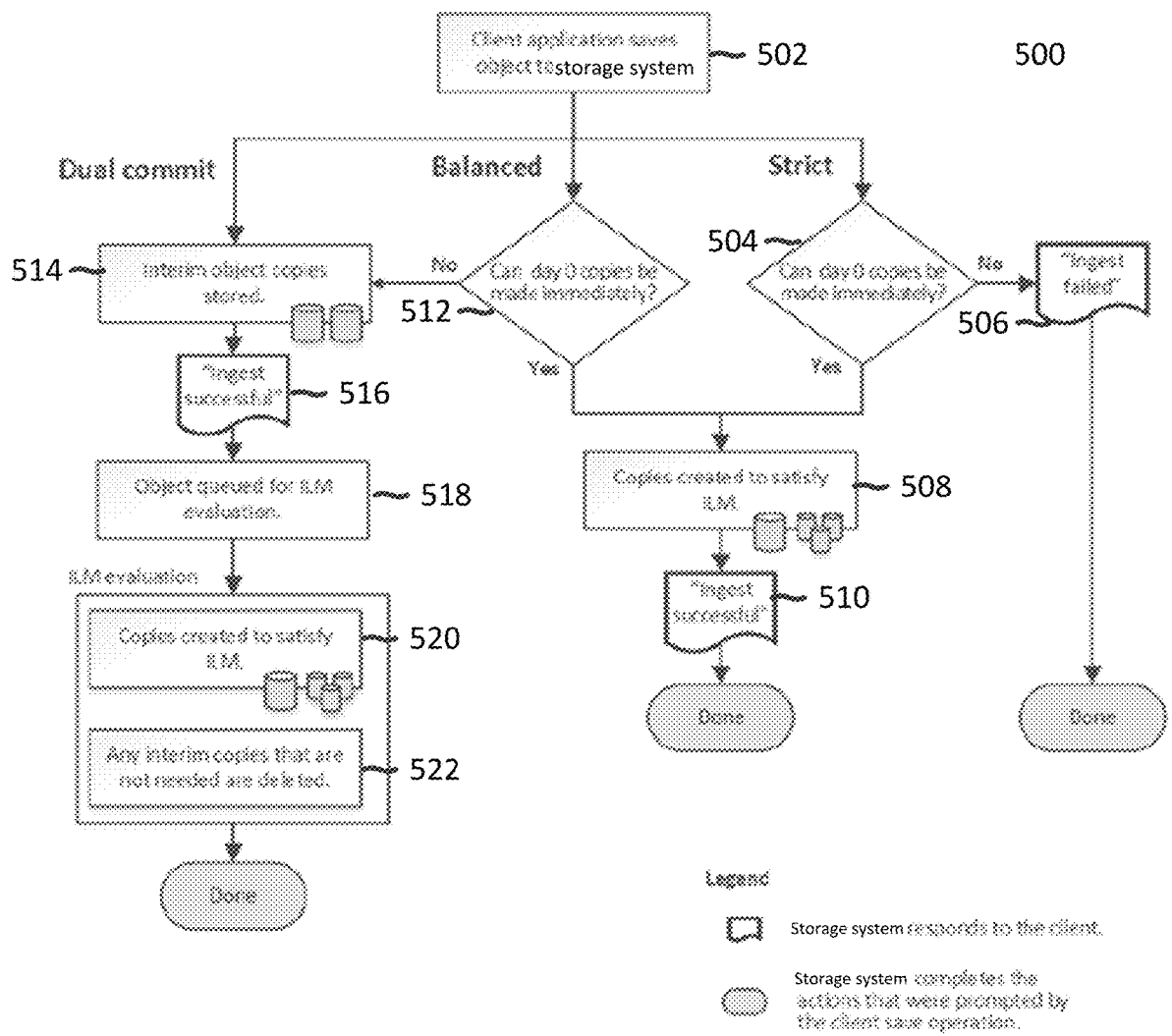
FIG. 5 is a flowchart of example operations for ingesting objects in a distributed storage system.

FIG. 5 is a flowchart of example operations for ingesting objects in a distributed storage system. The method 500 begins by a client application saving an object to the distributed storage system, at block 502. The distributed storage system may evaluate which ingest behavior a user selected when creating an ILM rule for ingest/an ILM policy. When a user creates an ILM rule, the user may specify whether the distributed storage system should protect objects at ingest using the dual commit, balanced, or strict options. Depending on the user selection, the distributed storage system makes interim copies and queues the objects for ILM evaluation later, or uses synchronous placement and makes copies to meet ILM requirements immediately. Each of the three options for protecting data at ingest (balanced, strict, or dual commit) is suitable in some circumstances.

Dual commit: When the user selects dual commit, the distributed storage system immediately makes interim object copies on two different storage nodes and returns an "ingest successful" message to the client. The object is queued for ILM evaluation and copies that meet the rule's placement instructions are made later. Dual commit provides a quick response to clients so that the distributed storage system is able to handle subsequent requests more promptly, and the redundant interim copies protect data against the loss of a storage node before ILM can be evaluated. However, if the interim copies do not meet the rule's placement instructions, dual commit may be less efficient as the distributed storage system must create, track, and delete object copies that are ultimately not required.

Strict: When the user selects the strict option, the distributed storage system may use synchronous placement on ingest and immediately makes the object copies specified in the rule's placement instructions. If it is not possible to create these copies, for example because a required storage location is temporarily unavailable, ingest fails. The client may retry the operation later. The Strict option ensures that objects are always offered the protection against loss that is specified in the rule's placement instructions. For example, objects can be protected against the failure of more than one storage node or against the complete failure of an entire site, if those protections are present in the rule. However, when using the strict option there may be a higher level of ingest failure, as transient issues can make creating the requested copies temporarily impossible.

Balanced: When the user selects the balanced option, the distributed storage system also uses synchronous placement on ingest and immediately makes all copies specified in the rule's placement instructions. In contrast with the strict option, if it is not possible to immediately make these copies the distributed storage system instead uses dual commit. Alternatively, a different default rule is used. The Balanced option provides high levels of data security, grid performance, and ingest success. Ingest can take longer, because the distributed storage system might need to create erasure coded objects or remote copies before it can return an "ingest successful" message to the client. In some embodiments of the distributed storage system, the balanced option may be provided as a default unless changed by a user.

Table 2 provides advantages of each of the ingest behavior options for protecting data.

TABLE 2

| Option | Advantages | Comments |
|---|---|---|
| Balanced | May be recommended for single site grids due to performance improvements<br>May offer better data security<br>May offer more efficient grid operation | In some embodiments, the balanced option cannot be used for these object placements:<br>Cloud Storage Pool at day 0<br>Archive Node at day 0<br>Placement in a Cloud Storage Pool or Archive Node when the rule uses a User Defined Creation Time as a Reference Time |
| Strict | May create certainty of object locations<br>May offer better data security<br>May create more efficient grid operation | In some examples, for erasure-coded objects, the use of strict should may be used in specified configurations.<br>In some embodiments, the strict option cannot be used for these object placements:<br>Cloud Storage Pool at day 0<br>Archive Node at day 0<br>Placement in a Cloud Storage Pool or Archive Node when the rule uses a User Defined Creation Time as a Reference Time |
| Dual commit | May offer faster ingest<br>May offer high rate of ingest success<br>May be used with all types of ILM placements | None |

If the distributed storage system evaluating an ILM rule or policy determines that the ingest behavior to be strict, the distributed storage system may determine whether day 0 copies may be made immediately to storage locations determined by the ILM rule, at block 504. The determined storage locations may be based on evaluating the ILM policy against metadata associated with the object. A day 0 copy may include an immediate copy of the object to the intended location. The day 0 copies include evaluating whether copies of the object can be made according to the ILM policy. Possible reasons a day 0 copy may not be made are if: the storage site is unavailable (e.g., a connection error), or the storage site is a storage site that cannot accept day 0 placements. In the case of a connection error, the distributed storage system (or a storage node of the distributed storage system) may attempt to reconnect with the unavailable resource. In an example embodiment, storage sites that cannot accept day 0 placements may include cloud storage pools (though a third-party cloud hosting service such as AMAZON Web Services (AWS) and MICROSOFT AZURE, and archive nodes (e.g., tape-based archival storage) which may not be able to store objects at ingest based on speed/bandwidth. requirements. Alternatively, third-party cloud services and/or archival storage may accept day 0 placements.

If a day 0 copy cannot be made immediately (block 504, no branch), the distributed storage system may send an ingest failed message to the client application that made the request, at block 506. In this example, the object is not copied to the distributed storage system. This ingest failed message may alert the client application that the object sent was not saved in the distributed storage system. The client application can resubmit the request to store the object.

If a day 0 copy can be made immediately (block 504, yes branch), copies are created by the distributed storage system to satisfy the ILM, at block 508. The distributed storage system may send an "ingest successful" message the client application indicating one or more copies of the object are stored in the distributed storage system according to the ILM policy from ingest.

If the distributed storage system evaluating an ILM rule or policy determines that the ingest behavior to be balanced, the distributed storage system may determine whether day 0 copies may be made immediately to storage locations determined by the ILM rule, at block 512. If a day 0 copy can be made immediately (block 512, yes branch), copies are created by the distributed storage system to satisfy the ILM, at block 508. The distributed storage system may send an "ingest successful" message to the client application indicating one or more copies of the object are stored in the distributed storage system. The message may indicate that the object was ingested according to the ILM policy from ingest. Alternatively, the ingest successful message may indicate the object was ingested without indicating whether the ILM policy had been followed or not.

If a day 0 copy cannot be made immediately (block 512, no branch), the distributed storage system may attempt to use the dual commit or another backup procedure.

If the distributed storage system evaluating an ILM rule or policy determines that the ingest behavior to be dual commit, or if storage of the object failed the balanced rules, the distributed storage system may store interim copies of the object at block 514. The interim copies may be made without consideration of an ILM rule or policy. The distributed storage system may send an "ingest successful" message to the client application, at block 516. The message may indicate one or more copies of the object are stored in the distributed storage system. The ingest successful message may indicate that interim copies were made. Alternatively, the ingest successful message does not indicate whether the object copy is temporarily stored or permanently stored in the distributed storage system.

Asynchronously, the distributed storage system may queue the object for ILM evaluation, at block 518. Copies of the object are created to satisfy the ILM, at block 520. Additional copies of the object may be made if they are not already present due to the temporarily stored copies. At block 522, any interim copies that are not needed are deleted.

Objects may be stored in the distributed storage system using various techniques including replication and erasure coding. When the distributed storage system matches objects to an ILM rule that is configured to create replicated copies, the system creates exact copies of object data and stores the copies on storage nodes or archive nodes. When a user configures an ILM rule to create replicated copies, the user may specify how many copies should be created, where those copies should be placed, and how long the copies should be stored at each location.

Figure 6A:
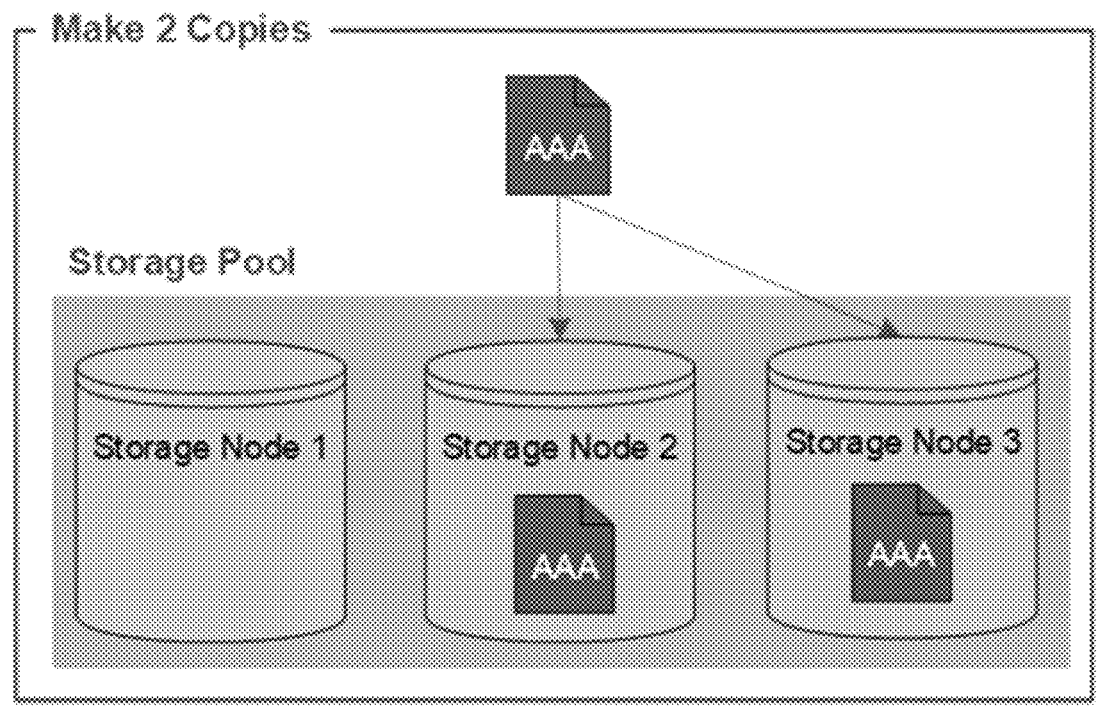
FIG. 6A illustrates an exemplary ILM rule.

For example, FIG. 6A illustrates an exemplary ILM rule that specifies that two replicated copies of each object be placed in a storage pool that contains three storage nodes. When the distributed storage system matches objects to this rule, the distributed storage system creates two copies of the object, placing each copy on a different storage node in the storage pool. The two copies might be placed on any two of the three available storage nodes. In this case, the rule placed object copies on storage nodes 2 and 3. Because there are two copies, the object can be retrieved if any of the nodes in the storage pool fails. In some examples, the distributed storage system can store only one replicated copy of an object on any given storage node. In this example, if the distributed storage system includes three storage nodes and an ILM rule is created to create 4-copies of the object, only three copies will be made-one copy for each storage node.

Erasure coding is the second method used by the distributed storage system to store object data. When the distributed storage system matches objects to an ILM rule that is configured to create erasure-coded copies, it slices object data into data fragments, computes additional parity fragments, and stores each fragment on a different storage node. When an object is accessed, it is reassembled using the stored fragments. If a data or a parity fragment becomes corrupt or lost, the erasure coding algorithm can recreate that fragment using a subset of the remaining data and parity fragments.

The distributed storage system may use an erasure coding algorithm such as the Reed-Solomon erasure coding algorithm which slices objects into k data fragments and computes m parity fragments (and are referred to using k+m notation). The k+m=n fragments are spread across n storage nodes to provide data protection. An object can sustain up to m lost or corrupt fragments. k fragments may be needed to retrieve or repair an object.

Figure 6B:
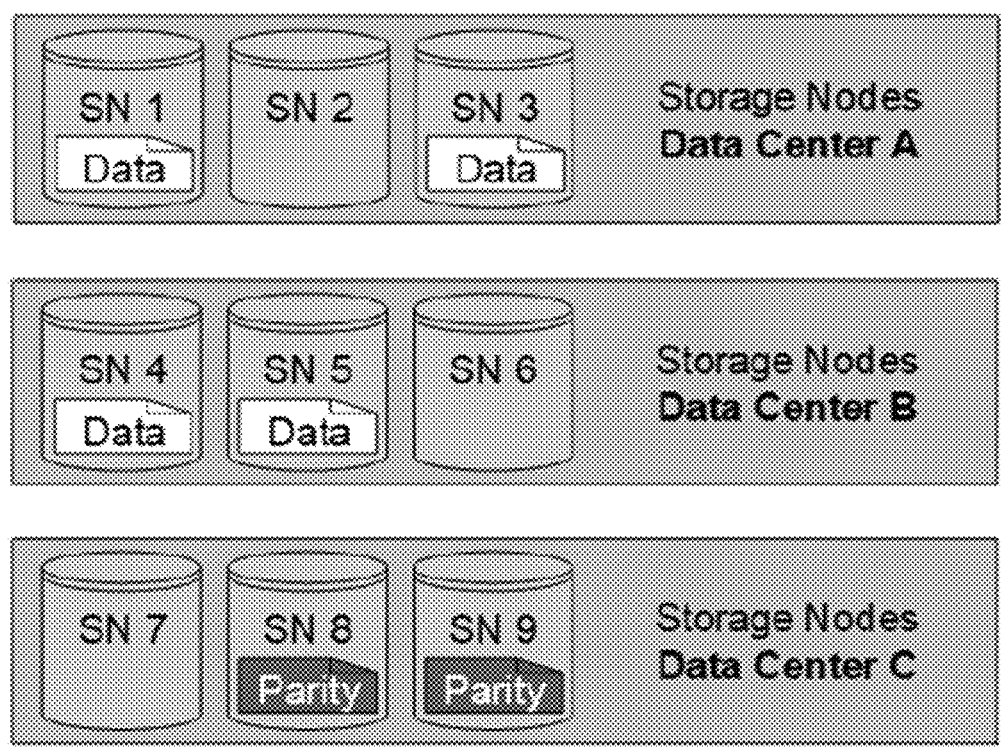
FIGS. 6B-6D illustrate the use of erasure coding algorithms on object data.

FIG. 6B illustrates the use of an erasure coding algorithm on an object's data. In the illustrated example, the ILM rule uses a 4+2 erasure coding scheme. Each object is sliced into four equal data fragments, and two parity fragments are computed from the object data. In a 6+3 erasure coding scheme, each of the six fragments is stored on a different node across three data center sites to provide data protection for node failures or site loss. Other erasure coding schemes such as 8+2, 6+2, 9+3, 2+1, 4+1, and 6+1 are available.

Figure 6C:
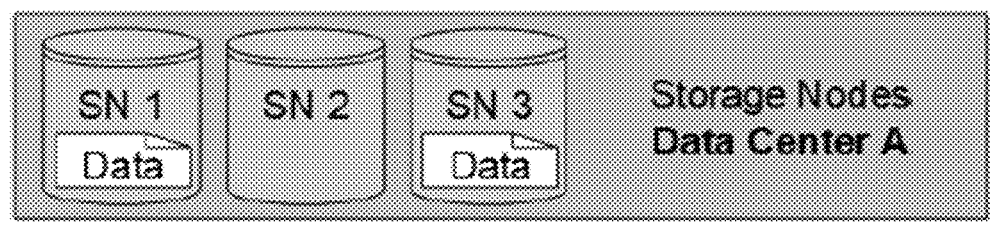
Figure 6C:
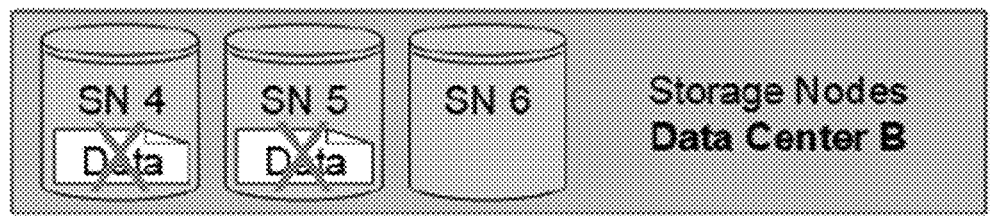
Figure 6C:
Figure 6D:
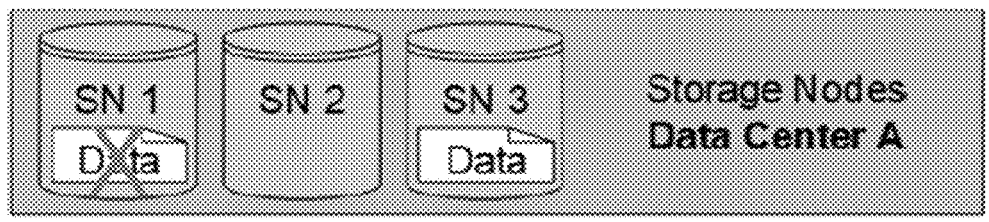
Figure 6D:
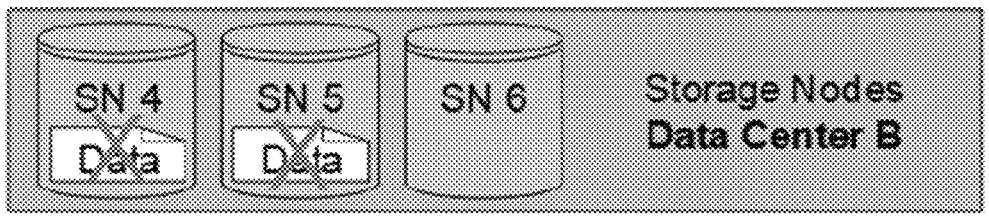
Figure 6D:
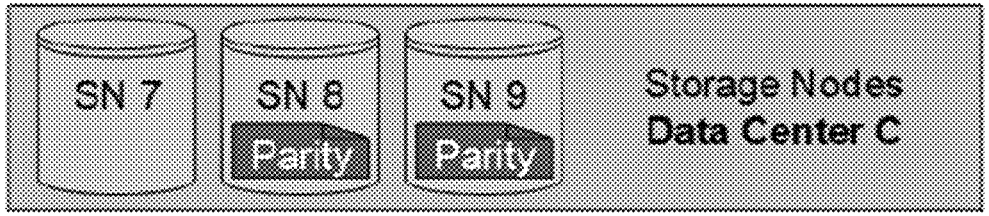

The 4+2 erasure coding scheme requires a minimum of nine storage nodes, with three storage nodes at each of three different sites. An object can be retrieved as long as any four of the six fragments (data or parity) remain available, as illustrated in FIG. 6C. Up to two fragments can be lost without loss of the object data. If an entire data center site is lost, the object can still be retrieved or repaired, as long as all of the other fragments remain accessible. If more than two storage nodes are lost, the object is not retrievable, as illustrated in FIG. 6D. When compared to replication, erasure coding may offer improved reliability, availability, and storage efficiency. However, an increased number of storage nodes and sites may be required as well as there may be increased retrieval latencies when erasure coding is used across geographically distributed sites.

ILM rules can be created to perform erasure coding on data (or data above a certain threshold size, e.g., 1 MB or 200 KB). At ingest, the distributed storage system may evaluate the ILM rules to determine whether dual commit, strict, or balanced options are selected. Each of the foregoing options may be used with erasure coding. However, creating erasure coded objects in a number of storage nodes may take longer and may have a greater chance of failure than using replication. In other embodiments, ILM rules that make use of erasure coding, in dual commit will not apply erasure coding until interim copies of the object are evaluated. In some embodiments, the strict option may not be available for erasure coding or has a greater likelihood of failure.

Figure 7:
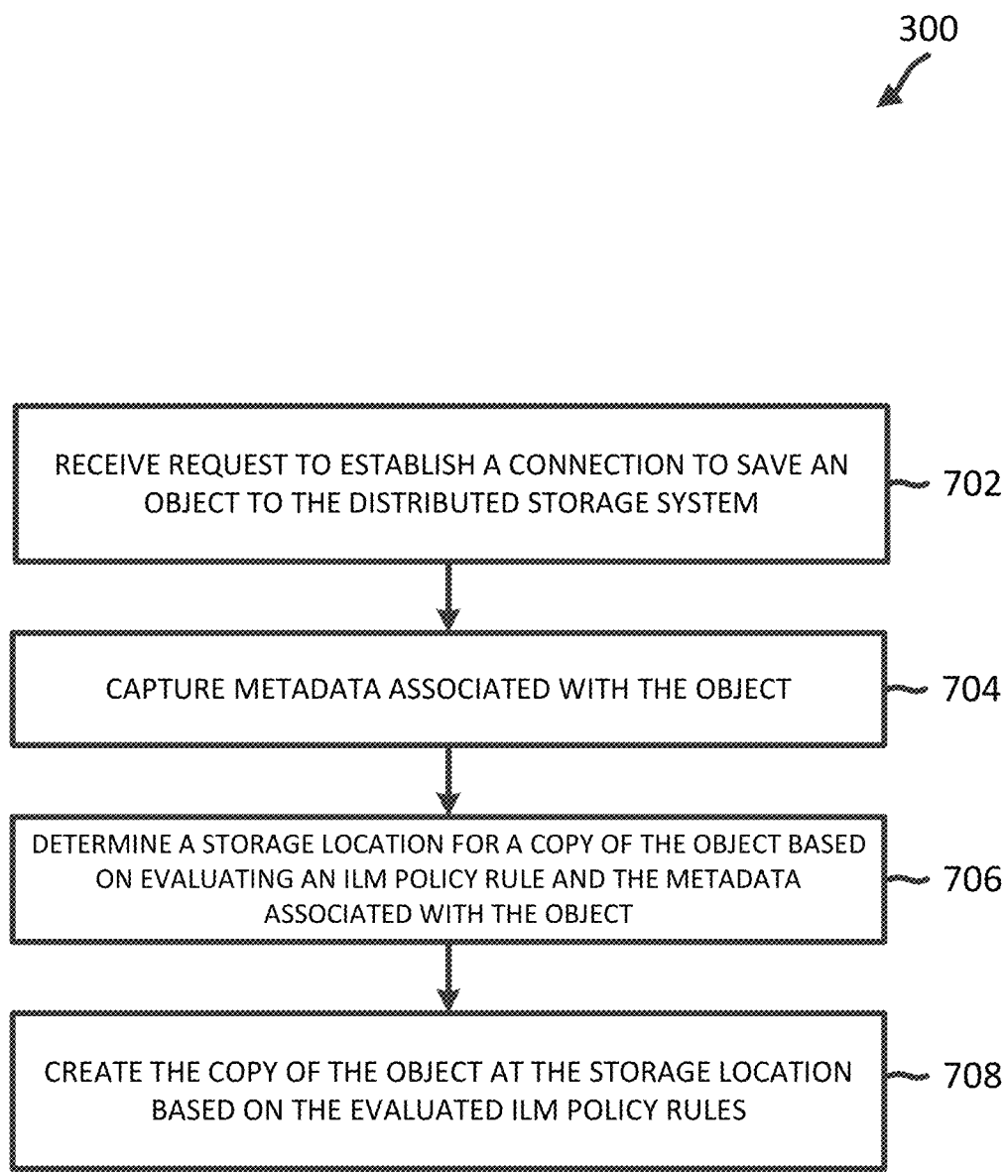
FIG. 7 is a flowchart of example operations for synchronous object placement for information lifecycle management.

FIG. 7 is a flowchart of example operations for synchronous object placement for information lifecycle management. The distributed storage system (or a storage node of the distributed storage system) may receive request to establish a connection to save an object to the distributed storage system, at block 702. The storage node of the distributed storage system may capture metadata associated with the object, at block 704. The metadata may include an ingest time, a last accessed time, an object name, a portion of the object name, an object key, a location of creation, an object size, a user metadata, and/or an object tag data. The distributed storage system may determine a storage location for a copy of the object based on evaluating an ilm policy rule and the metadata associated with the object, at block 706.

The distributed storage system may create the copy of the object at the storage location based on the evaluated ILM policy rules, at block 708. Creating the copy of the object at the one or more storage locations is based on determining the copy of the object can be made at ingest. Creating the copy of the object may be made synchronously with ingesting the object. The distributed storage system may return an "ingest successful" message to the client application. In some examples, creating the copy of the object includes storing data fragments of the copy of the object on different ones of the plurality of storage locations and parity fragments of the copy of the object on other ones of the plurality of storage locations.

Figure 8:
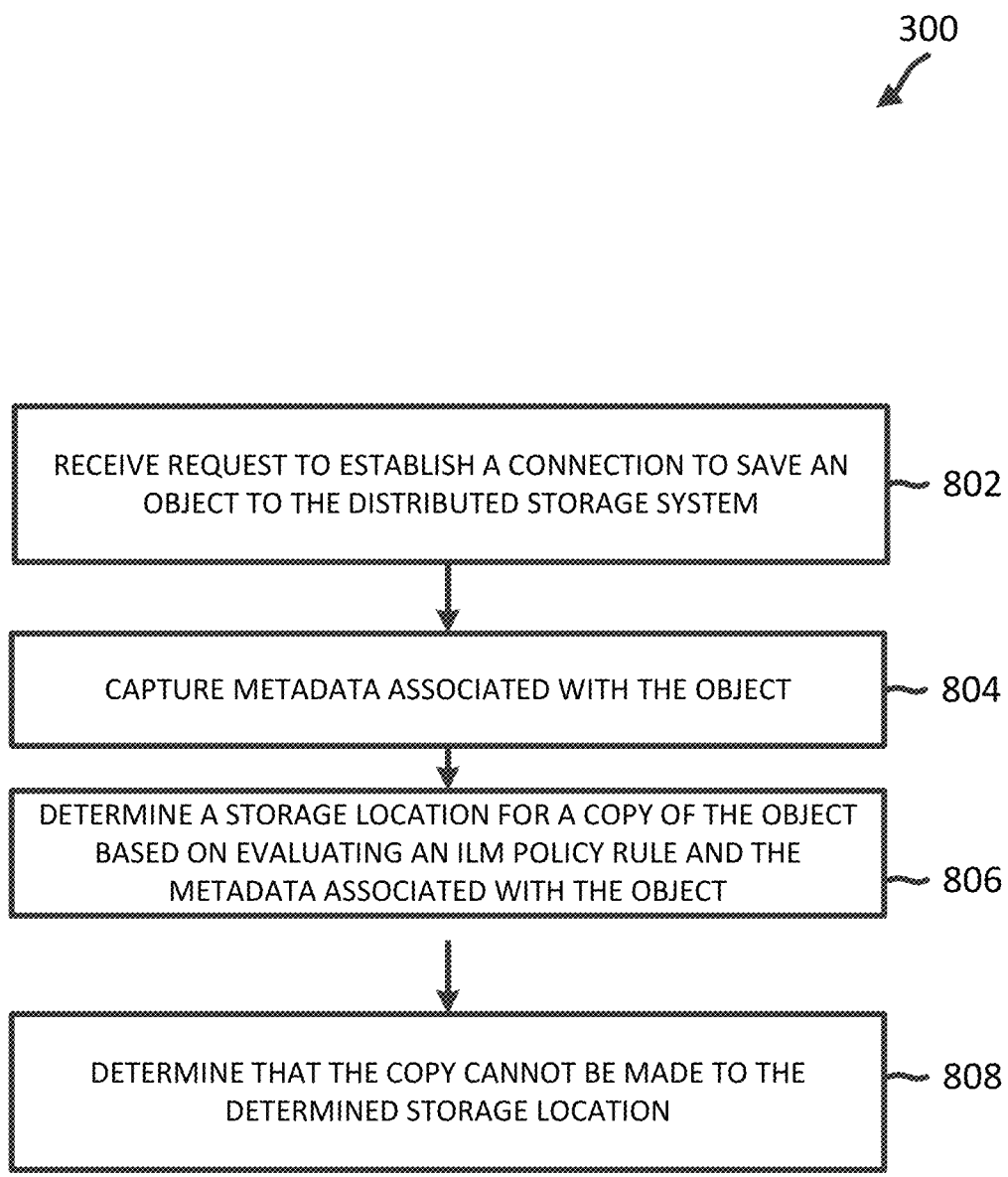
FIG. 8 is a flowchart of example operations for synchronous object placement for information lifecycle management.

FIG. 8 is a flowchart of example operations for synchronous object placement for information lifecycle management. The distributed storage system may receive request to establish a connection to save an object to the distributed storage system, at block 802. The distributed storage system may capture metadata associated with the object, at block 804. The distributed storage system may determine a storage location for a copy of the object based on evaluating an ILM policy rule and the metadata associated with the object, at block 806. The distributed storage system may determine that the copy cannot be made to the determined storage location, at block 808.

In an exemplary embodiment, the distributed storage system may send a message indicating ingesting the object failed based on a determined ingest option requiring compliance with the ILM policy rule at ingest of the object. In another exemplary embodiment, the distributed storage system may store the object based on a fallback ILM policy rule and return an ingest successful message to the client application. In a further embodiment, the distributed storage system may store two interim object copies at two different nodes of the distributed storage system. In yet another exemplary embodiment, the distributed storage system may store an object copy at each of a plurality of different nodes of the distributed storage system and perform an asynchronous evaluation of the ILM policy rule. The evaluation may be on the interim object copy. The distributed storage system may determine that the copy cannot be made to the determined storage location because the storage location is temporarily unavailable.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may generally be referred to herein as a "circuit." "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code or machine executable code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Program code for carrying out operations for aspects of the disclosure may be embodied as instructions in various forms depending on implementation. For example, instructions may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 9:
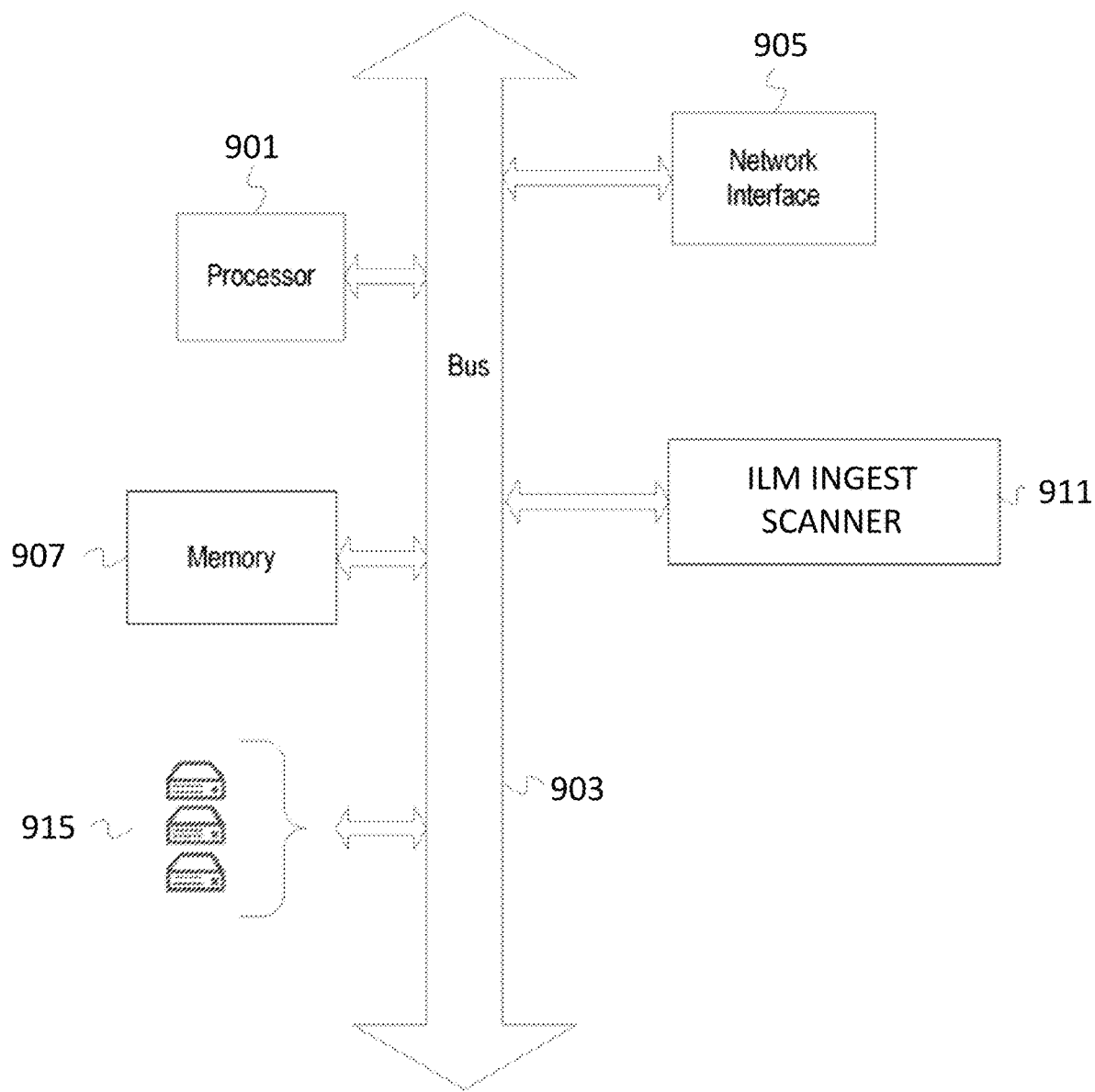
FIG. 9 depicts an example computer system with an information lifecycle management ingest scanner.

FIG. 9 depicts an example computer system with an information lifecycle management iterative scanner. The computer system includes a processor 901 (possibly including multiple processors, multiple cores, multiple nodes, and/or implementing multi-threading, etc.). The computer system includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 903 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The system also includes a set of storage devices 915 which can be magnetic storage device, optical storage devices, solid state storage devices, and/or a hybrid of storage devices. The computer system may submit read and write requests via the network interface 905 or a separate interface (e.g., a small computer system interface). The system also includes an ILM ingest scanner 911. The ILM ingest scanner 911 can apply an ILM rule set of the distributed storage system to objects based on object metadata synchronously, on ingest. Any one of the described functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 707 may be coupled to the processor 901.

While the aspects of the disclosure are described with reference to various implementations and exploitations, it will be understood that these aspects are illustrative and that the scope of the claims is not limited to them. In general, techniques for synchronous object placement using ILM as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A computer-implemented method by a hardware processor, comprising:
receiving, by a node of a distributed storage system from a client application, a request to save an object to the distributed storage system at a first storage site of the distributed storage system;
evaluating, synchronously with ingesting the object, an information lifecycle management (ILM) policy rule associated with the object for a selected ingest behavior, the selected ingest behavior comprising one of a strict option that applies the ILM policy rule synchronously on ingest, a balanced option that applies the ILM policy rule synchronously on ingest if synchronous application does not fail or falls back to a fall-back rule if the synchronous application fails, or a dual commit option that creates replicated copies at the node and then applies the ILM policy rule;
determining, synchronously with ingesting the object and based on selection of the strict option or the balanced option for the selected ingest behavior, a second storage site of the distributed storage system for a copy of the object based on the ILM policy rule and metadata associated with the object, the second storage site being different from the first storage site; and
returning, in response to storing the copy of the object at the second storage site based on the evaluated ILM policy rule, a response to the client application that sent the request indicating that the object was ingested.

2. The computer-implemented method of claim 1, further comprising:
falling back, by the node of the distributed storage system based on the balanced option for the selected ingest behavior, to an asynchronous rule in response to being unable to apply the ILM policy synchronously.

3. The computer-implemented method of claim 1, wherein the returning, in response to the selection of the strict option, comprises:
sending, in response to failing to store the copy of the object synchronously with ingesting the object, a message indicating ingesting the object failed.

4. The computer-implemented method of claim 1, wherein, in response to the evaluating identifying the dual commit option for the selected ingest behavior, the method comprises:
storing an interim object copy at each of a plurality of different nodes of the distributed storage system;
returning, in response to storing the interim object copy at each of the plurality of different nodes, the response to the client application indicating that the object was ingested; and
performing an asynchronous evaluation of the ILM policy rule on the interim object copy.

5. The computer-implemented method of claim 1, wherein the request comprises a multipart upload, the method further comprising:
applying, by the node of the distributed storage system, to each part of the multipart upload an ILM policy rule that is in place and active at a time of ingest of each part of the multipart upload.

6. The computer-implemented method of claim 1, wherein:
the second storage site comprises a plurality of storage locations, and
storing the copy of the object comprises storing data fragments of the copy of the object on different ones of the plurality of storage locations and parity fragments of the copy of the object on other ones of the plurality of storage locations.

7. The computer-implemented method of claim 1, wherein:
the metadata comprises at least one of an ingest time, a last accessed time, an object name, a portion of the object name, an object key, a location of creation, an object size, a user metadata, and an object tag data.

8. A computing device comprising:
a memory containing machine readable medium comprising machine executable code having stored thereon instructions for performing a method of ingesting an object to a distributed storage system;
a hardware processor coupled to the memory, the hardware processor configured to execute the machine executable code to cause the processor to:
receive a request from a client application to save the object to the distributed storage system at a first storage site of the distributed storage system;
capture, synchronously with ingesting the object, metadata associated with the object;
evaluate, synchronously with ingesting the object, an information lifecycle management (ILM) policy rule associated with the object for a selected ingest behavior comprising one of a strict option that applies the ILM policy rule synchronously on ingest, a balanced option that applies the ILM policy rule synchronously on ingest if synchronous application does not fail or falls back to a fall-back rule if the synchronous application fails, or a dual commit option that creates replicated copies and then applies the ILM policy rule;
determine, synchronously with ingesting the object, a second storage site of the distributed storage system for a copy of the object based on the metadata associated with the object and selection of the strict option or balanced option as the ILM policy rule; and
return, in response to storing the copy of the object at the second storage site based on the ILM policy rule, a response to the client application indicating that the object was ingested.

9. The computing device of claim 8, wherein the machine executable code is further configured to cause the hardware processor to:
fall back, based on the balanced option for the selected ingest behavior, to an asynchronous rule in response to being unable to apply the ILM policy synchronously.

10. The computing device of claim 9, wherein the hardware processor is unable to apply the ILM rule synchronously in response to a storage location for the second storage site being temporarily unavailable.

11. The computing device of claim 9, wherein the machine executable code is further configured to cause the hardware processor to:
return, in response to storing an object copy at each of a plurality of different nodes of the distributed storage system based on the asynchronous rule, a response to the client application indicating that the object was ingested.

12. The computing device of claim 8, wherein the machine executable code is further configured to cause the hardware processor, in response to the selection of the dual commit option, to:

return, in response to storing an interim object copy at each of a plurality of different nodes, the response to the client application indicating that the object was ingested; and perform an asynchronous evaluation of the ILM policy rule on the interim object copy.

13. The computing device of claim 8, wherein the machine executable code is further configured to cause the hardware processor, in response to the request comprising a multipart upload, to:

apply to each part of the multipart upload an ILM policy rule that is in place and active at a time of ingest of each part of the multipart upload.

14. The computing device of claim 8, wherein the balanced option is set as a default option for the distributed storage system.

15. A non-transitory machine readable medium having stored thereon instructions for performing a method comprising machine executable code which when executed by at least one machine, causes the machine to:

receive a request from a client application to save an object to a first storage site of a distributed storage system;

capture, synchronously with ingesting the object, metadata associated with the object;

evaluate, synchronously with ingesting the object, an information lifecycle management (ILM) policy rule associated with the object for a selected ingest behavior comprising one of a strict option that applies the ILM policy rule synchronously on ingest, a balanced option that applies the ILM policy rule synchronously on ingest if synchronous application does not fail or falls back to a fall-back rule if the synchronous application fails, or a dual commit option that creates replicated copies and then applies the ILM policy rule;

determine, synchronously with ingesting the object and based on the selected behavior comprising the strict option or balanced option, a second storage site of the distributed storage system for a copy of the object based on the metadata associated with the object, the second storage site being different from the first storage site; and return, in response to storing the copy of the object at the second storage site based on the ILM policy rule, an ingest successful response to the client application.

16. The non-transitory machine readable medium of claim 15, wherein the machine executable code when executed by the at least one machine causes the machine to:

send, in response to failing to store the copy of the object synchronously with ingesting the object and based on selection of the strict option, a message indicating ingesting the object failed.

17. The non-transitory machine readable medium of claim 15, wherein the machine executable code when executed by the at least one machine causes the machine to:

fall back to an asynchronous rule in response to being unable to apply the ILM policy synchronously.

18. The non-transitory machine readable medium of claim 15, wherein the machine executable code when executed by the at least one machine causes the machine to:

store, based on the dual commit option for the selected ingest behavior, an interim object copy at each of a plurality of different nodes of the distributed storage system;

return, in response to storing the interim object copy at each of the plurality of different nodes, the response to the client application indicating that the object was ingested; and perform an asynchronous evaluation of the ILM policy rule on the interim object copy.

19. The non-transitory machine readable medium of claim 15, wherein the request comprises a multipart upload, and wherein the machine executable code when executed by the at least one machine causes the machine to:

apply to each part of the multipart upload an ILM policy rule that is in place and active at a time of ingest of each part of the multipart upload.

20. The non-transitory machine readable medium of claim 15, wherein the balanced option is set as a default option for the distributed storage system.

* * * * *